3,551,020
OPTICAL APPARATUS WITH THREE LAYER PLASTIC SEAL
David Mark Cowan, Stanley Philip Cowan, and William Thomas Rickets, Kent, England, assignors to David Mark Cowan & Stanley Philip Cowan, trading in partnership as the Helio Mirror Company
Filed Aug. 23, 1968, Ser. No. 754,820
Claims priority, application Great Britain, Aug. 23, 1967, 38,746/67
Int. Cl. G02b 7/18
U.S. Cl. 350—67        8 Claims

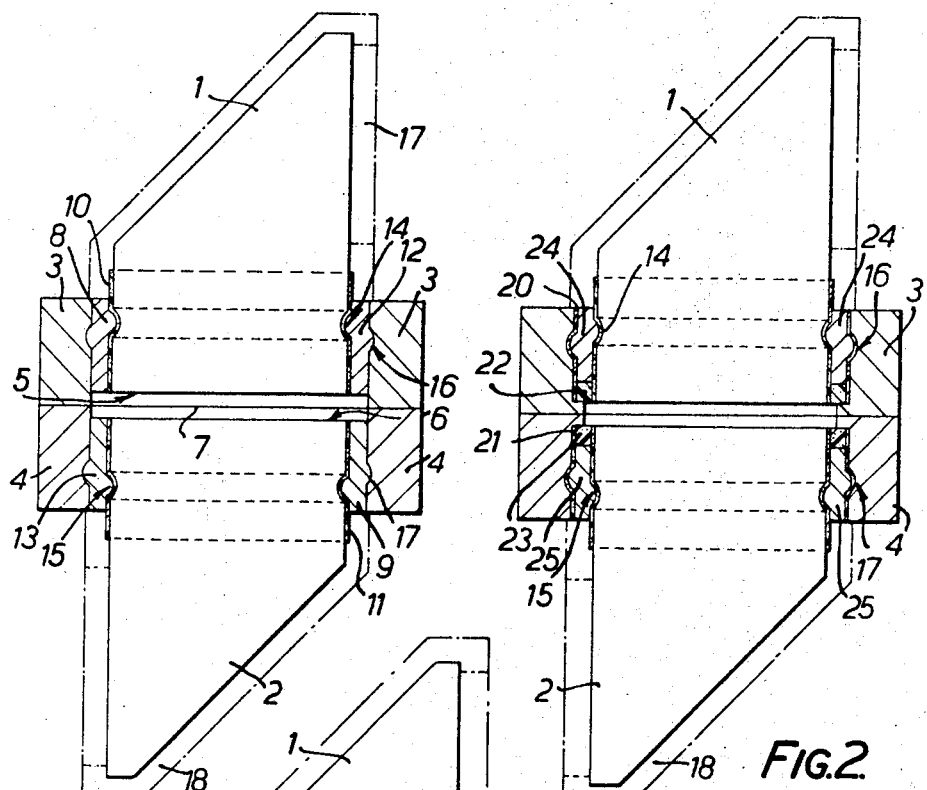
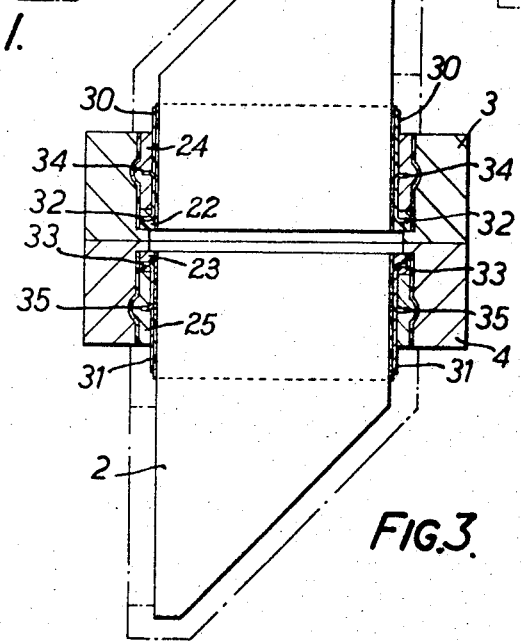
FIG.1.
FIG.2.
FIG.3.
David M. Cowan
Stanley P. Cowan
William T. Ricketts
INVENTORS
BY
Lawrence C. Laufscher
ATTORNEY United States Patent Office 3,551,020
Patented Dec. 29, 1970

ABSTRACT OF THE DISCLOSURE

The invention concerns optical assemblies, such as periscopes, including a body of glass sealed in a rigid mounting frame, which it may be desired to remove from the frame, for example for re-working the glass, and which must be able to withstand substantial differential pressure across the seal between prism and frame. According to the invention the surface of the prism is given in the sealing region a coating of plastic material which is compliant and strippable from the glass, the seal being completed by a harder material such as epoxy resin or fusible metal, moulded in position. The compliant material allows the prism to be recovered from the mounting without damage; the hard layer gives adequate mechanical support for the assembly to withstand differential pressures.

---

This invention relates to optical apparatus of the kind in which prismatic elements are secured in a mounting and supporting frame; an example of such an apparatus is a periscope.

In applicants' prior patent U.S. application Ser. No. 426,598 filed Jan. 19, 1965, now abandoned, and the copending divisional U.S. application divided therefrom, Ser. No. 752,546 filed Aug. 14, 1968, there are described methods of mounting the prismatic elements of apparatus, such as a periscope, in a mounting frame. The method of mounting such elements described in our prior applications has proved to be effective in practice and, as described in those specifications permits the removal of the elements from the mounting frame if at any time it is required to optically work the elements to recondition them.

In one form of periscope described in our earlier applications, two prismatic elements are mounted in a common frame member, with a space between the adjacent surfaces of the prismatic elements; a construction of this kind is very desirable for certain uses of periscopes. To prevent the adjacent surfaces of the two elements from becoming contaminated by dirt or moisture, the space between the surfaces is sealed and the space is preferably filled with dry gas, such as nitrogen.

In ordinary conditions of use an arrangement of this kind is satisfactory but from time to time is necessary to transport periscopes by air, in conditions when the periscopes will be subjected to ambient conditions of very low air pressure and low temperatures; with an aircraft flying at very high altitude the negative pressure differential may approach 12 to 15 lbs. per square inch. Also, it may be necessary for the same periscopes to be able to withstand use at tropical temperatures when positive pressure differentials will arise. With such widely varying ambient pressure conditions there is danger that the periscopes may be distored by the high range of pressure differentials that may exist across the elements.

With the present invention there is provided an optical assembly comprising a rigid mounting frame member and first and second glass prism members sealed in said frame member, said prism members having spaced adjacent surfaces so that a closed space is defined in part by said surfaces and in part by the seal, said prism members being sealed by a relatively thin layer of hardenable plastic material which in its hardened state is resilient and strippable from the glass and a relatively thicker layer of harder material moulded in position between the prism and frame members.

Further features and advantages of the invention will appear from the following description of embodiments thereof, given by way of example, in conjunction with the accompanying drawing in which:

FIG. 1 is a diagrammatic cross-sectional view of part of a periscope;

FIG. 2 is a corresponding view of a second form of the invention; and

FIG. 3 is a similar view of a third form of the invention.

The periscope shown in FIG. 1 comprises two optical elements 1 and 2, the elements being of similar shape and each consisting of a generally rectangular block portion surmounted by a portion of triangular cross-sectional shape, as shown. The two elements are mounted respectively in surrounding supporting and mounting frames 3 and 4, which can be combined in a single frame. If the frames 3 and 4 are not arranged as a single frame, means are provided for establishing a gas-tight seal between the two frames. The adjacent faces 5 and 6 of the elements 1 and 2 are separated from each other and, with the frames 3 and 4 define a space 7. This space is sealed and is filled with dry gas.

The elements 1 and 2 are secured respectively to their surrounding frames 3 and 4 by sealing means consisting of material inserted, and moulded in position, at 8 and 9.

For the reasons which are set out in our earlier applications, it is desirable that the materials such as 8 or 9 should be compliant and readily strippable, but in the conditions of service referred to a compliant mounting may give rise to distortion of the assembly due to the pressure differentials which arise.

To provide a mounting which has the advantages of the compliance of our earlier applications and which is also capable of withstanding pressure, the material inserted at 8 and 9 is of two parts. In assembly, there is first applied to the elements 1 and 2 respectively, at 10 and 11 a layer of plastic which has appreciable resiliency, so that the resultant mounting is thereby compliant. The plastic material can be applied in any convenient way, including the brushing on of the coating in a plastic condition, and subsequently causing or allowing it to harden. The material used can be of the type described in our earlier application, and can be polyvinyl chloride; polythioalcohol is preferred. Suitable material is that made available commercially by British Paints Ltd. as PR720, Bostik Sealing Compound 2105 or Bostik Caulking Compound. Such materials have a setting time at room temperature which is of the order of 3 to 4 hours, and harden fully in 48 to 72 hours depending on temperature.

After the element has been given this coating of plastic material, it is located with respect to the frame, such as 3, and there is then cast in position a body 12 or 13 of hard setting plastic, having good adhesive properties to both the frame such as 3 and the layer such as 10 of plastic material. In casting this material such as 12 in position, there can be used additional elements to serve as mould means, defining the space into which the plastic material is cast.

A suitable material for the body 12 is an apoxy resin, but there is a wide choice of suitable material. For example, it is possible to use as the plastic material a low melting point metal. The melting point of the metal chosen should be high enough to ensure that the metal will not soften at the highest temperature at which the complete optical system is likely to find service, and low enough to ensure that no damage will occur to the plastic layer 10, 11 or to the glass of prisms 1 and 2 when the metal is cast in position. A suitable temperature range is about 80° C. to 130° C.; metal having a melting point of 95° C. has been used successfully.

In order further to improve the strength of the attachment of elements 1 and 2 to the frames 3 and 4, the elements can be formed respectively with grooves 14 and 15, whilst the frames can be formed respectively with grooves 16 and 17. These grooves provide an improved key, once the plastic material 12 has hardened, and improve the capability of the assembly to withstand pressure differentials.

If desired, the external surfaces of the prisms 1 and 2 can be covered with a protective covering 17 and 18 which may be of plastic material or a combination of plastic materials, in the manner described in our earlier application.

FIG. 2 shows an alternative form of assembly; this generally resembles that of FIG. 1 and like parts bear like reference numerals. The arrangement of FIG. 2 differs from that of FIG. 1 in that in addition to providing coating layers 10 and 11 of plastic material on the prisms 1 and 2, similar coating layers 20 and 21 are provided on the inner surfaces of the mounting frames 3 and 4. After these layers have been provided upon the adjacent surfaces of the prisms, plugs 22 and 23 of the same material are moulded in position between the coating layers. By this means, a sound airtight seal is formed between the prisms and their respective mounting frames. The remaining space between the frames and the prisms at 24 and 25 is then filled with a harder material, such as epoxy resin or metal. As before, grooves 14, 15, 16, 17 can beprovided to give a firm key. With this construction there is ensured a good air seal and good mechanical support adequate to withstand operational differential pressures and avoid optical distortion of the assembly.

Another form of the invention is shown in FIG. 3. In this arrangement metal inserts 30 and 31 are used having projecting portions 32, 33, 35 which key into the bonding material between the prism, Flange-like portions 32 and 33 key into the flexible sealing material at 22 and 23, whilst portions 34 and 35, adjacent recesses 16 and 17, improve the key to the fusible metal or the like at 24 and 25. In addition, the metal insert improves the thermal conditions, making them more uniform when, in particular, fusible metal is used rather than resin to occupy the space between the prism and the frame. This reduces the possibility of damage to the plastic coatings and to the glass, due to heat, in addition to improving the mechanical strength of the arrangement.

In this way, there is provided an optical apparatus in which the elements are compliantly mounted, permitting their ready removal whilst at the same time ensuring adequate strength of attachment between the elements and the frames, so that the elements can withstand pressure differentials across the elements. While the invention has been described in relation to a periscope using two elements with an air space between them, the invention is applicable also to cases where it is desired firmly to seal an optical element within a mounting frame.

We claim:
1. An optical assembly, comprising
a rigid hollow frame;
a pair of optically aligned axially spaced prisms extending at adjacent ends within and circumferentially spaced from said frame;
and seal means mounting said prisms within said frame to define between the adjacent ends of said prisms a closed space, said seal means including for each prism successive first, second and third layers arranged concentrically about said prism within the circumferential space between said prism and said frame, said first and third layers being secured to the lateral wall surfaces of said prism and said frame means, respectively, said first and third layers each consisting of a layer of resilient strippable synthetic plastic material, said second layer having a thickness greater than the thicknesses of said first and third layers and consisting of a layer of relatively hard material molded concentrically between said first and third layers.
2. An optical assembly as defined in claim 1, wherein said first layer is formed from a polythioalcohol material.
3. An optical assembly as defined in claim 2, wherein said second layer is formed of an epoxy resin material.
4. An optical assembly as defined in claim 2, wherein said second layer is formed of a metal having a low melting point.
5. An optical assembly as defined in claim 1, wherein the wall surfaces of said frame means are parallel with and spaced from the corresponding prism surfaces, and further including key and groove means for connecting said seal means with said prism member and said frame means.
6. An optical assembly as defined in claim 1, and further wherein each of said seal means includes a metal insert disposed at least partly with said seal means for reducing temperature variations therein.
7. An optical assembly as defined in claim 5, and further including metal insert means cooperating with said key and groove means for connecting said seal means with said prism member and said frame means.
8. An optical assembly as defined in claim 1, wherein said first and third layers extend axially beyond said second layer at the end adjacent the closed space, and a fourth layer of resilient synthetic plastic material filling the space between the extensions of said first and third layers.

References Cited
UNITED STATES PATENTS

| | | | |
|---|---|---|---|
| 1,879,263 | 9/1932 | Huffschmidt | 350—67 |
| 2,400,401 | 5/1941 | Eckerman et al. | 350—287X |
| 2,437,947 | 3/1948 | Falkoff | 350—287 |
| 2,351,471 | 6/1944 | Bailey | 350—287 |
| 2,361,050 | 10/1944 | Paddock | 350—287 |
| 2,421,805 | 6/1947 | Peck | 350—67 |

FOREIGN PATENTS

| | | | |
|---|---|---|---|
| 1,420,869 | 11/1965 | France | 350—287 |

T. H. KUSMER, Assistant Examiner

DAVID SCHONBERG, Primary Examiner

U.S. Cl. X.R.

350—252, 253, 287